Figure 4:
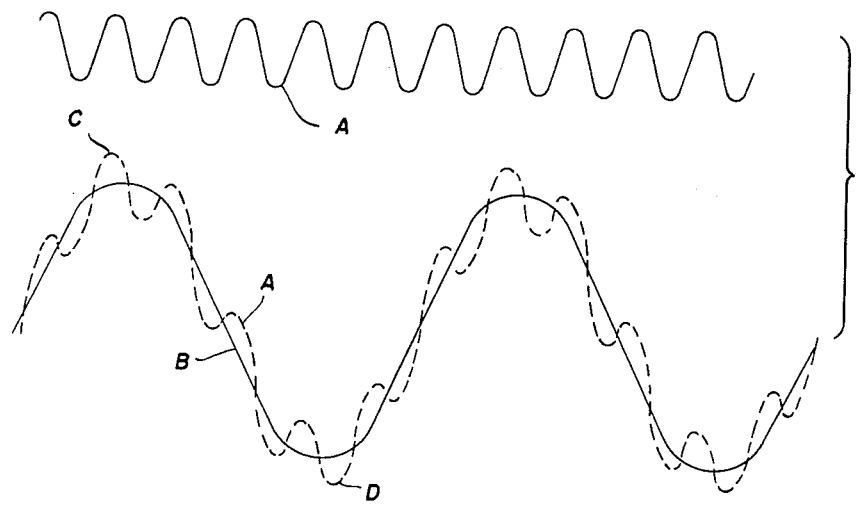

May 15, 1956    C. E. SEYMOUR    2,745,991
CENTRALIZED LOAD CONTROL SYSTEMS
Filed Jan. 3, 1951    2 Sheets-Sheet 1
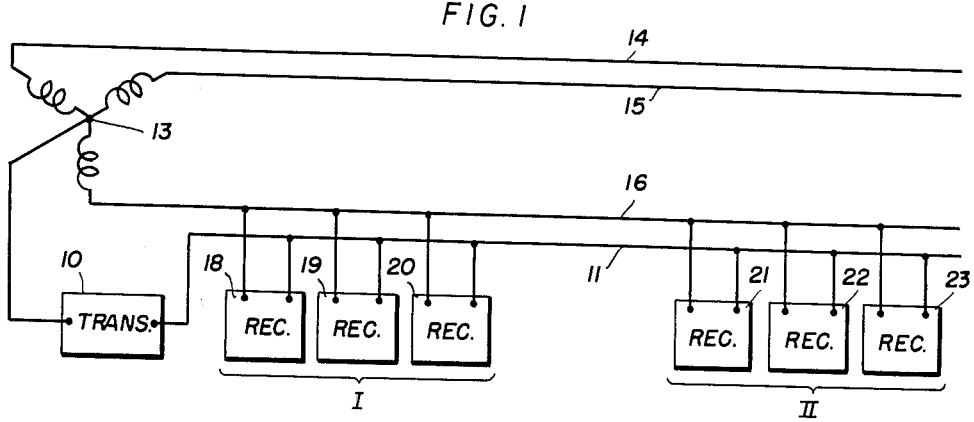
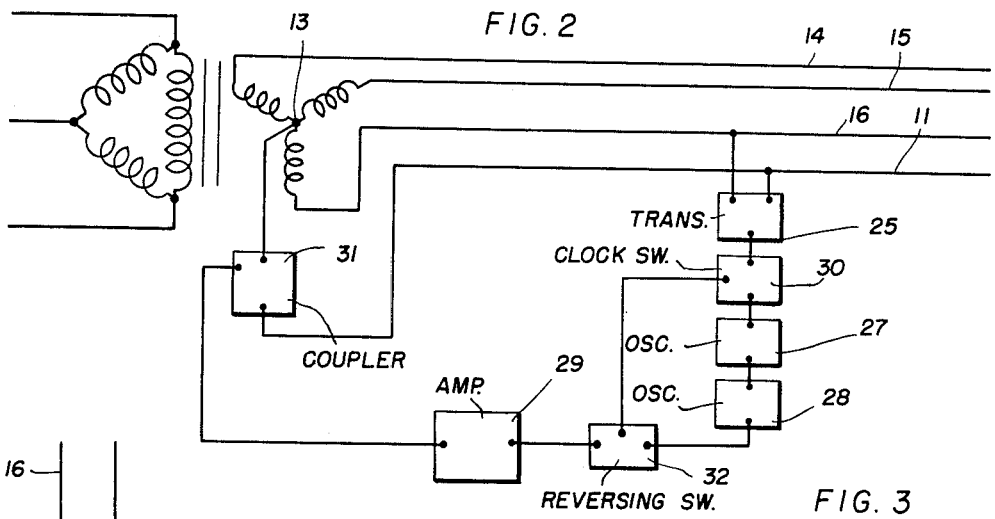
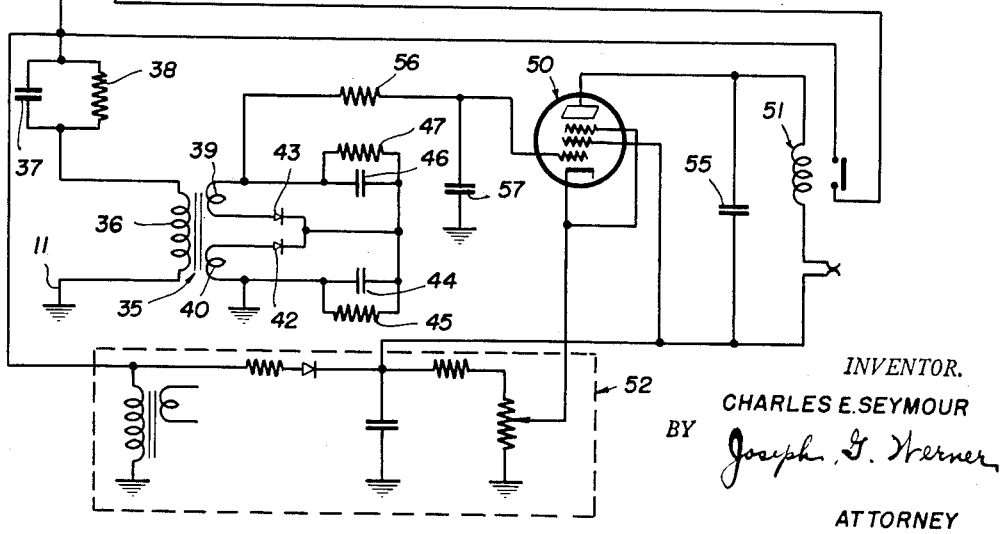
INVENTOR.
CHARLES E. SEYMOUR
BY Joseph G. Werner
ATTORNEY May 15, 1956  C. E. SEYMOUR  2,745,991
CENTRALIZED LOAD CONTROL SYSTEMS
Filed Jan. 3, 1951  2 Sheets-Sheet 2

INVENTOR.
CHARLES E. SEYMOUR
BY *Joseph G. Werner*

ATTORNEY

United States Patent Office 2,745,991
Patented May 15, 1956

2,745,991

CENTRALIZED LOAD CONTROL SYSTEMS

Charles E. Seymour, Baraboo, Wis.

Application January 3, 1951, Serial No. 204,221

5 Claims. (Cl. 317—142)

This invention relates generally to control systems for energizing or de-energizing electrical power apparatus remotely situated in power distribution systems and more particularly, it relates to a centralized load control system for selectively or non-selectively energizing or de-energizing load apparatus in a power distribution system.

In the operation of power distribution systems, it is known that during certain periods of each day, high peak loads occur which require stand-by generating apparatus for operation during the peak load periods. In order to reduce the amount of stand-by equipment, remote control systems have been devised for disconnecting household power consuming apparatus such as electrical water heaters and other forms of electrical heating apparatus. Thus, at certain times of the day when peak loads occur, a power distribution system can be controlled to reduce the load with respect to certain equipment which does not need to operate constantly.

Prior remote control systems for power distribution lines are comprised of apparatus for transmitting carrier signals from a central power station over the power lines for operating, on each consumer's premises, switching apparatus for connecting or disconnecting loads such as electrical water heaters. Because of the fact that these remote control systems depend upon the generation and transmission of carrier signals, they are subject to a number of disadvantages and defects. For example, a consumer's load control apparatus is subject to false operation or failure of operation as a result of false signals generated by interference from electrical apparatus, such as battery chargers, electrical welders, vacuum cleaners and small commutator type motors. Transients due to natural phenomena also cause failure or false operation of the consumer's control apparatus.

Many corrective measures have been taken to improve the quality of operation of carrier systems, such, for example, as providing coded signals and signals of predetermined time duration. However, these methods of signaling require complex receiving apparatus at the consumer's station, such, for example, as relays, motors, and circuit components which require many moving parts.

Accordingly, the principal object of this invention is to provide a novel, centralized load control system for power distribution systems.

Another object of this invention is to provide a load control system for power distribution lines wherein electrical interference from various power consuming devices does not cause false operation or failure of operation in the load control apparatus.

A further object of this invention is to provide a load control system for power distribution systems wherein coding of signals is not required for trouble-free operation on the power system.

A still further object of this invention is to provide in a load control system for power distribution systems a novel receiver wherein minimum power consumption is required and minimum operating voltage is required.

Another object of this invention is to provide in a load control system for power distribution systems, a novel receiver which requires very little signal power to operate so that any number of receivers can be operated on a system with very little signal input power.

Still another object of this invention is to provide in a load control system for power distribution systems a receiver which is economical and simple to manufacture.

In accordance with this invention, there is provided in a power distribution system a load control system comprising a frequency conversion means in the central power station for feeding a signal into the system consisting of an even harmonic of the power frequency and locked in with the power frequency, and a plurality of load control receivers connected to the distribution system each of which comprises a means for mixing the harmonic signal and a wave of power frequency for generating a signal of non-symmetrical wave form, a means for generating impulses in response to the signal of non-symmetrical wave form and a means responsive to said impulses for supplying a load control voltage adapted to energize or de-energize power consuming apparatus.

For a better understanding of the invention, together with other and further objects thereof, reference is made to the following description, taken in connection with the accompanying drawings, and its scope will be pointed out in the appended claims.

In the accompanying drawings:

Figure 1 of the drawings is a circuit diagram illustrating a power distribution system including load control apparatus provided in accordance with this invention.

Figure 2 of the drawings is a circuit diagram in block form illustrating transmission apparatus for impressing control signals on the power line.

Figure 3 of the drawings is a circuit diagram illustrating a receiver circuit for controlling load apparatus at a consumer's station.

Figure 4 of the drawings is a graph illustrating the wave form of the transmitted signal.

Figure 5:
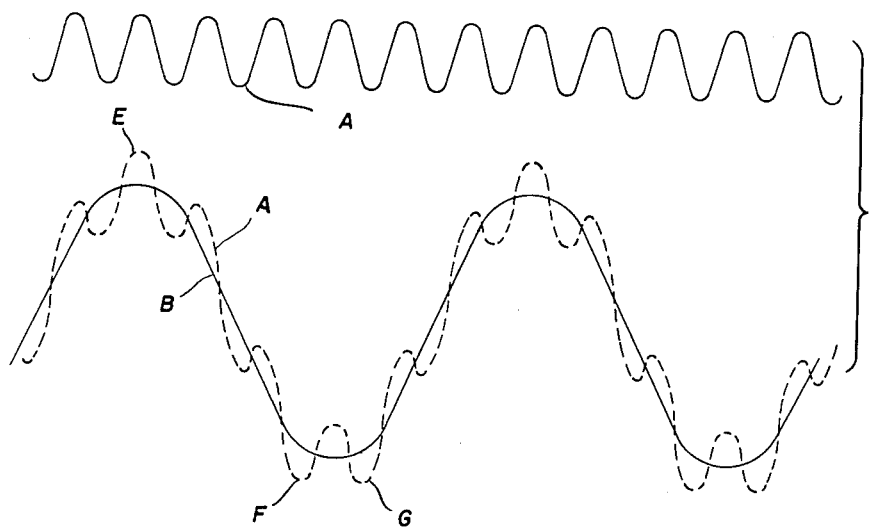

Figure 5 of the drawings is a graph illustrating the wave form of the signal appearing in the receiver illustrated in Figure 3.

In accordance with this invention, there is provided a load control system for power distribution systems illustrated generally in Figure 1 of the drawings. At the central power station there is provided a transmitter 10 which is adapted to be connected to the neutral line 11 and the Y point 13 of the station transformer bank whereby signals are impressed on each of the power distribution lines 14, 15 and 16. For purposes of illustration consumer stations 18, 19 and 20 are shown as grouped together in group I and stations 21, 22 and 23 are shown in another group, group II.

Referring to Figure 2 of the drawings, transmitter 10 consists of a source of voltage supply 25 coupled to the neutral line 11 and also to line 16. This coupling unit may comprise any suitable conventional transformer. An oscillator 27 is fed by unit 25 and functions to triple the power line frequency. This oscillator may be any conventional oscillator which can be driven from a source of one frequency for supplying an output having three times the frequency of the original source. Coupled to oscillator 27 is a second oscillator 28 adapted to be driven for doubling the frequency of the output of oscillator 27. As in the case of oscillator 27, oscillator 28 may be any conventional oscillator adapted to double the frequency of its input wave. The frequency of the power line being 60 cycles, the frequency of the output of oscillator 28 will be the 6th harmonic of 60 cycles or 360 cycles. In the output of oscillator 28 there is provided an amplifying means 29 for increasing the amplitude of the 6th harmonic wave to its desired level.

Control relays actuated by a clock switch 30 are connected between the source of voltage supply 25 and the oscillators 27 and 28 and are used to control the supply of voltage to the transmitter when signals are to be transmitted. A reversing switch 32 connected between the oscillators 27 and 28 and amplifier 29 is used to reverse the phasing of the output voltage for separate "on" and "off" signals.

Transformer 31 may be arranged to include selected L and C components thereby to adjust to resonance at the 6th harmonic signal. Figure 4 of the drawings illustrates the desired phase relationship of the 6th harmonic wave A with respect to power frequency wave B. Phase shift of the output voltage is accomplished with a conventional type phase shift network which is incorporated in the oscillator section 28. It will be noted that when these two waves are superimposed on one another, the amplitude with respect to the axis of the combined waves is equal at points C and D. The reasons for this phase relationship will become apparent when the operation of the receiver is described.

Figure 3 of the drawings illustrates the receiver circuit which is illustrated in block form at each of the consumers' stations 18, 19, 20, 21, 22 and 23 in Figure 1. At each receiver there is provided a wave mixing and phase shifting circuit consisting of a transformer 35 comprising a primary winding 36 connected in series with parallel connected condenser 37 and resistor 38 and between a power line such, for example, as line 16 and ground which may be the neutral line 11. Condenser 37 and resistor 38 function to tune primary 36 of transformer 35 to the 6th harmonic signal voltage generated in the transmitter, and the primary 36, condenser 37 and resistor 38 are designed to have the proper values to shift the phase of the 6th harmonic wave with respect to the phase of the power line wave. Despite the tuning of primary 36, a small amount of the power line wave appears across primary 36 whereby the 60 cycle wave and the 6th harmonic wave are added. This composite wave is illustrated in Figure 5 of the drawings wherein it will be noted that the positive peak E of 6th harmonic wave A has a greater amplitude than either of the negative peaks F and G on the negative half of the composite wave. Thus when a 6th harmonic signal voltage is transmitted from the transmitter, an unbalanced wave appears across primary 36 of transformer 35.

Primary 36 is coupled with two balanced secondary windings 39 and 40 connected in phase opposition with one another. Between these two secondary windings, rectifiers 42 and 43 are connected in series opposition to one another. Across secondary 40 and rectifier 42 are connected a condenser 44 and a resistor 45, these two elements being in parallel with one another. Across secondary 39 and rectifier 43 there are connected a condenser 46 and a resistor 47, these two elements also being connected in parallel with one another. During normal operation of the system when no 6th harmonic wave is present on the power line wave, rectifiers 42 and 43 pass half waves of equal amplitude and in phase opposition to one another whereby condensers 44 and 46 are charged to equal potentials in phase opposition and no signal is developed across the secondary windings 39 and 40. However, when the 6th harmonic wave is superimposed on the power line wave, an unbalanced condition occurs whereby the peak E of 6th harmonic wave A increases the voltage across one secondary while the peaks F and G decrease the voltage across the other secondary. Thus, condenser 44, for example, charges to a higher potential than that of condenser 46 whereby a differential voltage appears across the network including the secondaries, condensers and resistors.

The upper terminal of transformer secondary 39 may be coupled to the control grid of amplifier tube 50 the anode of which may be coupled to the winding of load control relay 51. Tube 50 may be energized from a power supply circuit 52 which may be of conventional design so long as it supplies proper voltages to the various electrodes of tube 50. The cathode of tube 50 is normally biased from power supply 52 in such a way that the output of tube 50 is not sufficient to actuate load control relay 51 but will hold the relay contacts closed after actuation. When the load control signal is impressed on the receiver station the differential voltage which was described heerinbefore biases the grid of tube 50 to such an extent that the anode current increases sufficiently to actuate relay 51 and thereby connect the load apparatus.

For preventing false operation of relay 51 by normal types of electrical interference it is desirable that condensers 44 and 46 have comparatively low values and that the parallel circuits consisting of condenser 44, resistor 45 and condenser 46, resistor 47 have very short time constants. As a further safety provision, a condenser 55 may be connected in parallel with the coil of relay 51 for the purpose of delaying the operation of relay 51 when the voltage across it is increased or decreased. The delay period may be determined in accordance with the time duration of the signal voltage whereby any transient voltages of less time duration than the delay period would fail to operate the relay.

For providing control of different groups of receivers, a resistor 56 may be connected in series with the control grid of tube 50 and a condenser 57 may be connected between this control grid and ground thereby to provide a timing circuit. For example, the receivers in group I would not include the resistor 56 and condenser 57. The transmitter may be timed to transmit the 6th harmonic wave for a period of five seconds and all of the receivers in group I would be operated. The receivers in group II, on the other hand, may be provided with resistor 56 and condenser 57 having such values that their time constant amounts to ten seconds, for example. In order to operate this group of receivers the transmitter could be arranged to transmit a 6th harmonic wave for a period of 15 seconds thereby to operate all of the receivers in group II. Other groups of receivers may be provided with time constant circuits having different periods whereby the transmitter may be operated for a predetermined period for the purpose of operating the receivers in a predetermined group.

The operation of the load control system provided by this invention may be summarized as follows.

At a predetermined time when it is known that peak loads will occur, the timing switch 30 operates automatically to feed a control signal having a frequency equal to an even harmonic of the power line frequency. At the receivers the even harmonic signal is impressed in the phase shifting and wave mixing circuit consisting of the transformer primary 36 and condenser 37 and resistor 38. The even harmonic wave is shifted in phase with respect to the power line wave to produce a composite wave such as shown in Figure 5 having a greater positive amplitude than negative amplitude. Through transformer 35 the rectifiers 42 and 43 in polar opposition to one another charge the condensers 45 and 46 to unequal potentials whereby a differential voltage appears across the secondary windings 39 and 40 and is impressed on the control grid of tube 50. This differential voltage causes the output of tube 50 to decrease to a value sufficient to open relay 51. Assuming that the transmitter impresses a control signal for a period of five seconds the output of tube 50 will be decreased for an equal period. After the expiration of the control signal, relay 51 will hold its contacts in open position due to the fact that normal idling current is sufficient to hold the contacts of relay 51 closed.

At the termination of the peak load period the transmitter may be operated by the timing switch 30 to transmit another signal for operating the remotely located receivers and closing the contacts of relay 51. As stated previously, the normal output of tube 50 is insufficient to close relay 51 with normal idling current. Therefore, it is necessary to increase the output of tube 50 which is accomplished by reversing the phase of the even harmonic signal generated at the transmitter. The timing switch 30 may be arranged to accomplish such phase reversal by providing the phase reversal switch 32 which operates automatically from the clock switch 30. As a result, the differential voltage appearing across secondaries 39 and 40 will be positive with respect to the differential voltage generated with respect to the initial signal and will bias the control grid of tube 50 in such a manner as to increase the output of tube 50 whereby the current of relay 51 is increased to a value sufficient to close the contacts of relay 51. When signal is removed, current in relay 51 will return to normal idling current and relay contacts will remain closed.

It will be noted that the 6th harmonic of the power line voltage has been mentioned as the preferred signal frequency. Other even harmonics are equally adaptable for use in accordance with this invention. Preferably, they should be multiples of the third harmonic neutral current, such as, 720–1080–1440, etc. This selection of frequencies makes it possible to produce signals of equal strength on all three phases of the system.

Even harmonics are chosen because of the fact that odd harmonics such as the 3rd, 5th, 7th, etc. appear in a power line system and may also be present in the output of the coupling transformer 31. However, when these harmonics are added to the power line voltage regardless of phase angle, a symmetrical wave is formed with equal peak voltages. Because these peak voltages have equal amplitudes, the receivers do not respond thereto and no false operation of the receivers occurs due to power line odd harmonics. It is further noted that even harmonics produced by half wave rectifying devices such as A. C.-D. C. radios, battery chargers and the like have their highest magnitude in the second harmonic and therefore receiver input transformers tuned to the higher harmonics reject enough of the second harmonic so that the receivers do not respond thereto.

From the foregoing description of this invention, it is apparent that it provides positive operation of remotely located load control apparatus without the use of expensive or complex apparatus having a multiplicity of moving parts. The combination of the particular phase changing apparatus with the time constant circuits prevents false operation due to signals generated by electrical interference or variation of load on the power line. Coding of signals is not required and the apparatus may be operated with minimum drain of power from the power system and minimum operating voltages. Thus, additional safety is provided without heavy insulation of receiver components.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a power distribution system, a central power station including an alternating voltage wave of power frequency, frequency conversion means connected thereto for deriving from the power line voltage wave a signal consisting of an even harmonic of said wave, coupling means connected to said frequency conversion means and said station for adding said harmonic wave to the power voltage wave in such phase relationship as to form a composite wave having positive and negative peaks of equal amplitude, a load control receiver connected to said system comprising a phase shifting means coupled to said system for shifting the phase of said harmonic wave with respect to the phase of the power voltage wave to a degree sufficient to form a second composite wave having a positive and negative peak of unequal amplitude and load control means responsive to peaks of greater amplitude.

2. In a power distribution system, a central power station including an alternating voltage wave of power frequency, frequency conversion means connected thereto for deriving from the power line voltage wave a signal consisting of an even harmonic of said wave, coupling means connected to said frequency conversion means and said station for adding said harmonic wave to the power voltage wave in such phase relationship as to form a composite wave having positive and negative peaks of equal amplitude, a load control receiver connected to said system comprising a phase shifting means coupled to said system for shifting the phase of said harmonic wave with respect to the phase of the power voltage wave to a degree sufficient to form a second composite wave having positive and negative peaks of unequal amplitude, and impulse generating means coupled to said phase shifting means for generating an impulse in response to said second composite wave, and load control means responsive to said impulse.

3. In a power distribution system, a central power station including an alternating voltage wave of power frequency, frequency conversion means connected thereto for deriving from the power line voltage wave a signal consisting of an even harmonic of said wave, coupling means connected to said frequency conversion means and said station for adding said harmonic wave to the power voltage wave in such phase relationship as to form a composite wave having positive and negative peaks of equal amplitude, a load control receiver connected to said system comprising a phase shifting network coupled to said system for shifting the phase of said harmonic wave with respect to the phase of the power voltage wave to a degree sufficient to form a second composite wave having positive and negative peaks of unequal amplitude, a differential voltage generating means coupled to said network for generating a differential voltage in response to said second composite wave, a load control relay, an electron tube coupled to said differential voltage generating means and said relay, and means for biasing said tube to provide a normal output voltage of sufficient magnitude to hold said relay but of insufficient magnitude to actuate said relay and to provide an output signal voltage in response to said differential voltage of sufficient magnitude to actuate said relay.

4. In a power distribution system, a central power station including an alternating voltage wave of power frequency, frequency conversion means connected thereto for deriving from the power line voltage wave a signal consisting of an even harmonic of said wave, coupling means connected to said frequency conversion means and said station for adding said harmonic wave to the power voltage wave in such phase relationship as to form a composite wave having positive and negative peaks of equal amplitude, a load control receiver connected to said system comprising a phase shifting network including a transformer coupled to said system for shifting the phase of said harmonic wave with respect to the phase of the power voltage wave to a degree sufficient to form a second composite wave having positive and negative peaks of unequal amplitude, a differential voltage generating means coupled to said transformer for generating a differential voltage in response to said second composite wave, a load control relay, an electron tube coupled to said differential voltage generating means and said relay, and means for biasing said tube to provide a normal output voltage of sufficient magnitude to hold said relay but of insufficient magnitude to actuate said relay and to provide an output signal voltage in response to said differential voltage of sufficient magnitude to actuate said relay.

5. In a power distribution system, a central power station including an alternating voltage wave of power frequency, frequency conversion means connected thereto for deriving from the power line voltage wave a signal consisting of an even harmonic of said wave, coupling means connected to said frequency conversion means and said station for adding said harmonic wave to the power voltage wave in such phase relationship as to form a composite wave having positive and negative peaks of equal amplitude, load control receiver connected to said system which comprises a phase shifting network including a transformer primary coupled to said system for shifting the phase of said harmonic wave with respect to the phase of the power voltage wave to a degree sufficient to form a second composite wave having positive peaks of greater amplitude than that of the negative peaks, a differential voltage generating means coupled to said transformer primary for generating a differential voltage in response to said second composite wave comprising a pair of oposed secondary windings, rectifying means connected between said secondary windings, and a time constant network connected across said windings for eliminating the effects of transient impulses, a load control relay, an electron tube including a control grid coupled to said rectifying means and an anode coupled to said relay, and means for biasing said tube to provide a normal anode voltage of sufficient magnitude to hold said relay but of insufficient magnitude to actuate said relay and to provide an anode signal voltage in response to said differential voltage of sufficient magnitude to actuate said relay.

References Cited in the file of this patent

UNITED STATES PATENTS

| | | |
|---|---|---|
| 1,689,867 | Evans | Oct. 30, 1928 |
| 1,834,771 | Eastman | Dec. 1, 1931 |
| 2,149,486 | Ytterberg | Mar. 7, 1939 |
| 2,183,725 | Seeley | Dec. 19, 1939 |
| 2,263,298 | Haimbaugh | Nov. 18, 1941 |
| 2,357,995 | Blomberg | Sept. 12, 1944 |
| 2,415,468 | Webb | Feb. 11, 1947 |
| 2,457,607 | Seymour | Dec. 28, 1948 |

FOREIGN PATENTS

| | | |
|---|---|---|
| 551,978 | Great Britain | Mar. 18, 1943 |